Figure 1:
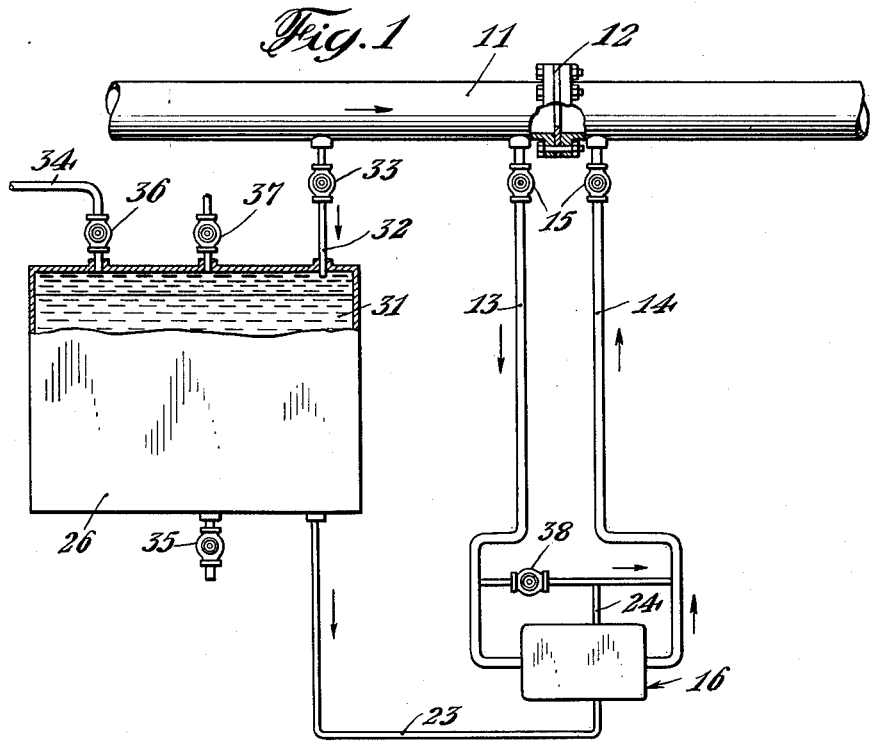

April 29, 1952  W. P. THURBER ET AL  2,594,519

PROPORTIONING AND FEEDING APPARATUS

Filed Oct. 4, 1947

INVENTORS
Walter P. Thurber
Joseph I. Montel
BY
M. R. Marsh
ATTORNEY

Patented Apr. 29, 1952

2,594,519

UNITED STATES PATENT OFFICE 2,594,519

PROPORTIONING AND FEEDING APPARATUS

Walter P. Thurber, Valley Stream, and Joseph I. Montel, Jamaica, N. Y.

Application October 4, 1947, Serial No. 778,008

8 Claims. (Cl. 210—31)

The present invention relates primarily to apparatus for proportioning and regulating the feeding and mixing of chemicals or like substances to water or other fluids, and more particularly to an improved arrangement and apparatus for adding a chemical solution to a fluid flowing at a variable rate in a conduit in direct proportion to the amount of fluid flowing.

It is often desirable to add a wetting agent, detergent or other such solutions to a fluid flowing at a variable rate in a conduit in direct proportion to the amount of fluid flowing in the conduit. For example, it is often desirable to add a solution, such as a detergent, to the water flowing in a main supplying a large laundry washer, in order that the properties of the water be controlled or conditioned within desirable limits whereby the water will have the proper characteristics and be properly conditioned for any process for which the water is intended. Other examples of where it is desirable to add a solution to a liquid in a conduit in proportion to the amount of fluid flowing are in the treatment of boiler feed water where a rust and/or corrosion inhibiting agent is added to the water as it is fed to the boiler, and the adding of a wetting agent to the water flowing through a fire hose from an open hydrant in order that the water have better effect in extinguishing a fire.

In accordance with the above it is therefore an object of the present invention to provide apparatus for adding or feeding a wetting agent, detergent, or other solution to a fluid flowable at a variable rate in a conduit, in direct proportion to the amount of fluid flowing.

Another object of the invention is to provide apparatus of the above nature which is simple in construction, effective and positive in operation, which has a minimum of movable parts, and which is extremely accurate in operation.

Another object of the invention is to provide a device of the above type wherein the solution added to the fluid flowing in a conduit is diluted or pre-mixed with the fluid prior to the injection thereof into the conduit.

Still another object of the invention resides in the provision of a device of the above type operative to add a solution to a fluid flowing at a variable rate in a conduit in proportion to the amount of fluid flowing independently of the static pressure in the system.

Still another object of the invention is to provide a manual control for a device of the above type for changing or varying the amount of solution which is added to a given quantity of fluid flowing in a conduit.

Figure 2:
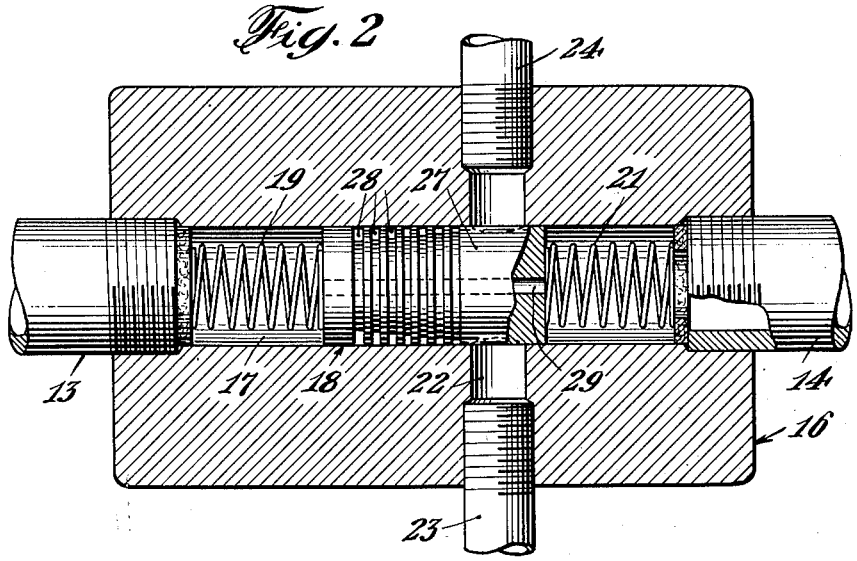

The above and further objects of the invention will be more apparent from the following detailed description thereof wherein reference is made to the accompanying drawings, in the latter of which:

Fig. 1 is a diagrammatic representation of the invention showing the application thereof to a water main; and Fig. 2 is an enlarged detail sectional view of the control or proportioning unit or valve employed in the system.

In the following detailed description of an explanatory embodiment of the invention, it is described in the manner in which it may be employed to add a chemical solution to water flowing in a main. Such a solution when added to the water in the main may, for example, be one which conditions the water to have the proper pH content and while the invention is hereinafter described as it may be employed in one such specific instance, it will be obvious that the invention is not limited to this particular use but may be employed for all similar purposes where it is desired to add a solution to a fluid flowing at a variable rate in a conduit in direct proportion to the quantity of fluid flowing.

Referring first to Fig. 1, a main 11, such as a water main which may, for example, supply a large building, is shown in which the flow of water is from left to right or in the direction of the arrow. Inserted in the main in an appropriate manner is an orifice disc 12 to produce a pressure differential on opposite sides of the orifice in direct proportion to the velocity or quantity of flow of liquid in the main 11. Instead of the orifice disc 12, various other arrangements such as a Pitot tube may be employed to develop a pressure differential in proportion to the velocity of flow.

Connected to the main 11 through suitable connections on opposite sides of the orifice disc 12 are two pressure taps 13 and 14 which may have shut-off valves 15 therein. The pressure taps 13 and 14 connect to a proportioning unit indicated generally by reference numeral 16. In the embodiment of the invention shown, the pressure taps 13 and 14 are connected, as by suitable threaded connections, to left and right hand sides, respectively, of the proportioning unit 16.

As more clearly shown in Fig. 2, the proportioning unit 16 has a horizontal central bore 17 therethrough connecting or communicating with the two ends of the pressure taps 13 and 14. Located within the central horizontal bore 17 of the proportioning unit 16 and freely movable therein is a piston member indicated generally by reference numeral 18. The piston 18 has a reasonably close fit with the walls of the bore 17, and in a manner described hereinafter, it is caused to move therein.

In the normal or static condition of the apparatus or when there is no flow in the main 11, the piston 18 assumes a position such as that shown in Fig. 2, and is held in or moved to this position by compression springs such as 19 and 21 exerting substantially equal pressures against opposite ends thereof.

The proportioning unit 16 also has a vertical bore 22 therein which connects or communicates with the horizontal bore 17. The bore 22 is preferably somewhat smaller than the bore 17 and has taps 23 and 24 suitably connected to the lower and upper ends thereof respectively. The tap 23 as shown in Fig. 1 extends to the lower or discharge part of a chemical storage tank 26 while the upper tap 24 connects to or is joined with the pressure tap 14.

The piston 18 has a solid portion 27 which, in the normal position of the piston as shown in Fig. 2, is in registry with the vertical bore 22 of the proportioning unit 16 to thereby block the bore 22 and prevent the flow of the chemical solution therethrough from the tap 23 to the tap 24. To the left of the solid portion of the piston 18 are a series of circular grooves 28 which progressively increase in depth and/or width toward the left hand end of the piston. In other words, each groove 28 from right to left increases in depth and/or width. The piston 18 also has extending longitudinally through the center thereof a relatively small bore 29, the purpose of which will hereinafter be described.

In the embodiment of the invention shown, it is assumed that the chemical solution 31 within the storage tank 26 is of somewhat greater specific gravity than the liquid or water flowing in the main 11. Hence such a chemical solution will tend to remain in the lower section of the tank and as it is used it will be displaced by water entering the tank at the top through a tap 32. Obviously, with a chemical solution of less specific gravity than the liquid flowing in the main 11, the tap 32 would be connected to the lower part of the chemical storage tank 26 and tap 23 connected to the top of the tank. As shown, the tap 32 is connected to the upstream side of the orifice disc 12 with a valve 33 therein. The chemical solution storage tank 26 may be filled with a chemical solution through a suitable connection 34 in any convenient and well known manner. The connection 34 may have a valve 36 therein and the tank 26 may have a valved drain 35 and a valved vent 37 to facilitate the filling of the tank 26.

The operation of the device is as follows. When a flow in the main 11 occurs, the pressure differential on the two sides of the orifice disc 12 will be in proportion to the velocity and/or quantity of the flow in the main, and this differential pressure will be established through the pressure taps 13 and 14 to opposite sides of the piston 18. Depending upon the difference in pressure, the piston 18 will move to the right from its normal position, or that shown in Fig. 2, an amount equal to the difference in pressure on opposite ends thereof. As the piston 18 moves to the right, the notches, grooves or openings 28 therein are brought into alignment or registry with the vertical bore 22. Depending on the amount of movement of the piston 18, a greater number of progressively increasing sized grooves or openings will be brought into alignment with the bore 22 to provide a larger passageway for the chemical solution from tap 23 to tap 24. The grooves 28 in the piston 18 are arranged to provide a passageway between the taps 23 and 24 in a fixed relation relative to the movement of the piston which in turn is proportional to the pressure difference on opposite ends of the piston. Since the pressure differential on opposite sides of the orifice disc 12 will, through the above described arrangement of taps to the proportioning unit 16, be established between the lower and upper ends of the bore 22, the chemical solution will flow therethrough or from tap 23 to tap 24. By arranging the grooves or openings 28 in the piston 18 and selecting proper springs 19 and 21 to control the size or area of the passageway between the taps 23 and 24 in a predetermined relation with respect to the pressure developed by fluid flow in the main 11, and taking into account the pressure differential between the taps 23 and 24 which also varies proportionally to the water flow, the amount of chemical solution added to the water in the main can be controlled to be in proportion to the amount of water flowing. For example, if the rate of flow of water in the main 11 doubles, the corresponding increase in pressure differential across the orifice disc 12 will move the piston 18 to such a position that twice the quantity of chemical solution passes through the bore 22. The increased flow of chemical solution is obtained by virtue of the increased size of the passageway from tap 23 to tap 24, as produced by movement of the piston, and by virtue of the increase in pressure differential between the taps 23 and 24.

In addition to causing displacement of the piston 18 to the right, the pressure differential on opposite sides of the orifice 12 causes a small amount of water to flow through the center hole 29 in the piston and into the pressure tap 14. This small flow of water into pressure tap 14 picks up or merges with the chemical solution delivered through tap 24 and thereby effects a premixing of the chemical solution with the water prior to the discharge of the mixture into the main 11. This dilution of the chemical prior to its delivery into the main stream flow insures quicker and more complete mixing and delivery thereof to the main. The small hole 29 in the piston also permits the same to move from one position to another, such as back to its neutral or normal position without displacement of or forcing water out of the bore 17. Obviously, a decrease in the rate of flow of the water in the main 11 decreases the pressure differential on opposite ends of the piston 18 whereupon the piston responds thereto and the action of its co-operating springs 19 and 21 will move to correspondingly control the flow of chemical solution from the tank 26.

At times it may be desirable to change the proportion or rate at which the chemical solution is added to the water, or, in other words, to vary the amount of chemical solution from the tank 26 that is added to a given quantity of water flowing in the main 11. To effect this control, an adjustable valve 38 is connected between pressure tap 13 and tap 24. By adjusting the valve 38, the pressure differential established on opposite sides of the orifice disc 12 by water flowing in the main 11 may be only partially effective on opposite ends of the piston 18, as the valve 38 permits a part of the pressure differential to be dissipated therethrough before it can be effective on the piston 18. Accordingly, with only a part of the established pressure differential effective on opposite ends of the piston 18, its movement will be reduced proportionally and therefore provide less passageway through the chemical solution bore 22 or between taps 23 and 24 so that a smaller quantity of chemical solution will be added to a given quantity of water flowing in the main in accordance with the adjustment of the valve 38.

It will be noted that the movement of the piston 18 is the result of the pressure differential developed by water flow in the main 11, and the pressure differenial also effects flow of the chemical solution from the storage tank, and these functions are both independent of the static pressure on the system. Accordingly, the apparatus will function independently of the static pressure.

While the invention has been described herein in but a single illustrative embodiment thereof, it will be obvious to those skilled in the art that various changes and modifications may be made therein without departing from the spirit or essential attributes thereof, and it is desired therefore that only such limitations be placed thereon as are specifically set forth in the appended claims.

What is claimed is:

1. In a device of the type described, a conduit for conveying a flow of liquid, means for developing a pressure differential in said conduit in proportion to the rate of flow of liquid therein, a reciprocal piston member, means including hydraulic connections to the different pressure sections in said conduit for moving said piston member from a normal position in a definite relation with respect to the pressure differential developed, a closed container for a solution for addition to the liquid in said conduit, means controlled by the movement of said piston member and the developed pressure differential and including other hydraulic connections from said container to the different pressure sections in said conduit for regulating the flow of said solution into said conduit in direct proportion to the quantity of liquid flowing therein, and means including a flow of said fluid through said first named hydraulic connections for mixing said solution with liquid from said conduit prior to the discharge thereof into said conduit.

2. In a fluid pressure system, a main adapted to convey a flow of a first fluid under pressure, means in said main for developing a pressure differential in proportion to the quantity of flow in said main, a proportioning unit including a piston, pressure taps for conveying the pressure differential developed by said means to opposite ends of said piston and moving the piston proportionally from a normal position, a closed container for containing a second fluid for addition to the fluid in said main, a conduit from said container to the low pressure side of said main, a valve in said conduit, means including said piston and controlled by the movement thereof to operate said valve for determining the rate of addition of said second fluid to said first fluid, a conduit from the high pressure side of said main to the container of said second fluid, and means including said last conduit whereby the pressure differential developed by said pressure differential developing means produces flow of said second fluid from said container through said valve into said main.

3. In a device of the type described, a conduit for conveying a flow of liquid, means including a restriction in said conduit for developing a pressure differential in proportion to the rate of flow of liquid in said conduit, a valve means operated by a piston having a normal position and movable from said position by and in accordance with the developed differential pressure, means including hydraulic connections from the high and low pressure sides of said restriction for operating said piston in accordance with the developed differential pressure, a closed container for a solution for adding to the liquid in said conduit, a passageway through said valve which is restricted inversely in accordance with the movement of said piston from a normal position to thereby in part control the flow of the solution from said container to said conduit, and means including said last named hydraulic connections to render said developed differential pressure effective to impart control and cause flow of the solution through said passageway to said conduit.

4. In a liquid proportioning system comprising a main adapted to convey a flow of a first liquid, means in said main for developing a pressure differential in proportion to the quantity of flow in said main, a proportioning unit including a movable piston, pressure taps for conveying the pressure differential developed by said means to opposite ends of said piston, said pressure differential displacing said piston from a normal position in accordance with said pressure differential, a closed container for containing a second liquid for addition to the first liquid in said main, a first conduit from the high pressure side of said main to said container, a second conduit from said container to the low pressure side of said main, a valve in the second one of said conduits operated by said piston, and means including the pressure differential developed by said pressure differential developing means for causing a flow of said second liquid through said valve into said main.

5. In a device of the type described, a conduit adapted to convey a flow of a liquid under pressure, means including a restriction in said conduit for developing a pressure differential in proportion to the rate of flow of liquid in said conduit, a valve, means for operating said valve from a normal position in accordance with the developed differential pressure, a closed container for a solution for addition to said liquid, hydraulic connections between said container and the high and low pressure sides of said restriction in said conduit with said valve in one of said connections, and means dependent upon said developed differential pressure also causing flow of said solution from said container through said valve to said conduit as said valve is operated by said pressure differential whereby said solution is added to the liquid in said conduit in proportion to the amount of liquid flowing therein.

6. In a device of the type described, a conduit adapted to convey a flow of a liquid under pressure, means including a restriction in said conduit for developing a pressure differential in proportion to the rate of flow of liquid in said conduit, a reciprocal piston member, means including hydraulic connections from the high and low pressure sides of said restriction for moving said piston member from a normal position in a definite relation with respect to the pressure differential developed, a closed container for a solution for addition to the liquid in said conduit, hydraulic connections from said container to the high and low sides of said restriction, variable valve means in one of said last-named hydraulic connections controlled by the movement of said piston member and means including the developed pressure differential and said valve means for regulating and causing the flow of said solution into said conduit in direct proportion to the quantity of liquid flowing therein.

7. In a proportioning device of the type described for adding a solution to a liquid flowing in a conduit in proportion to the quantity of liquid flowing, means including a restriction in said conduit for developing a pressure in proportion to the rate of flow of said liquid in said conduit, a closed container for a supply of solution for addition to said liquid, hydraulic connections between said supply and the high and low pressure sections in said conduit, a valve in one of said hydraulic connections, means controlled by said developed pressure and also including hydraulic connections to the high and low pressure sections in said conduit for variably operating said valve from a normal position in accordance therewith, said developed pressure also causing flow of said solution from said container through said valve to said conduit in proportion to the flow of liquid therein, and means for varying the effect of said developed pressure on said valve to thereby change the proportion in which said solution is added to the liquid in said conduit.

8. In a proportioning device of the type described for controlling the addition of a solution to a liquid flowing in a conduit in proportion to the quantity of liquid flowing, means for developing a pressure differential in said conduit dependent upon the rate of flow of said liquid therein, a closed container for a supply of solution for addition to said liquid, a pair of hydraulic connections between said supply and sections of different pressure in said conduit, a valve including a movable piston in one of said hydraulic connections, means including other hydraulic connections to said different pressure sections in said conduit to cause said developed pressure to operate said valve piston from a normal position in accordance therewith, means including one of said first named hydraulic connections for enabling said developed pressure to produce flow of said solution through said valve to said conduit, and means including resilient means for operating said piston toward said normal position as said pressure differential decreases.

WALTER P. THURBER.
JOSEPH I. MONTEL.

REFERENCES CITED

The following references are of record in the file of this patent:

UNITED STATES PATENTS

| Number | Name | Date |
|---|---|---|
| 412,910 | Blessing | Oct. 15, 1889 |
| 549,479 | Hall | Nov. 5, 1895 |
| 868,776 | Gregory et al. | Oct. 22, 1907 |
| 1,085,348 | Ledoux | Jan. 27, 1914 |
| 1,875,022 | Krueger | Aug. 30, 1932 |
| 1,897,492 | Ledoux | Feb. 14, 1933 |
| 1,943,039 | Randolph | Jan. 9, 1934 |
| 1,967,690 | Sherman | July 24, 1934 |
| 2,062,231 | Ornstein | Nov. 24, 1936 |
| 2,238,747 | Ornstein | Apr. 15, 1941 |
| 2,311,532 | Gershon | Feb. 16, 1943 |